United States Patent
Desai et al.

(10) Patent No.: US 7,058,556 B2
(45) Date of Patent: Jun. 6, 2006

(54) ADAPTIVE AERO-THERMODYNAMIC ENGINE MODEL

(75) Inventors: Mihir C. Desai, Yorba Linda, CA (US); Cristina Crainic, Longueuil (CA)

(73) Assignees: Goodrich Pump & Engine Control Systems, Inc., West Hartford, CT (US); Pratt & Whitney Canada Corp., Longueuil (CA)

( * ) Notice: Subject to any disclaimer, the term of this patent is extended or adjusted under 35 U.S.C. 154(b) by 1015 days.

(21) Appl. No.: 09/963,221

(22) Filed: Sep. 26, 2001

(65) Prior Publication Data

US 2003/0074171 A1    Apr. 17, 2003

(51) Int. Cl.
G06F 7/48 (2006.01)
G06F 17/10 (2006.01)

(52) U.S. Cl. .................. 703/8; 703/2; 700/31
(58) Field of Classification Search ............. 703/2, 703/8; 700/28–31; 415/1, 119; 416/87; 244/17.19
See application file for complete search history.

(56) References Cited

U.S. PATENT DOCUMENTS

| | | | | | |
|---|---|---|---|---|---|
| 5,388,956 | A | * | 2/1995 | Pla et al. ................. | 415/1 |
| 5,391,053 | A | * | 2/1995 | Pla et al. ................. | 415/119 |
| 5,566,907 | A | * | 10/1996 | Marze et al. ............ | 244/17.19 |
| 5,620,300 | A | * | 4/1997 | Knuijt .................... | 415/119 |
| 5,620,303 | A | * | 4/1997 | Moffitt et al. ........... | 416/87 |

FOREIGN PATENT DOCUMENTS

| EP | 1 091 106 A2 | 9/2000 |
|---|---|---|
| WO | WO 98/36966 | 8/1998 |
| WO | WO 02/04799 A1 | 1/2002 |

OTHER PUBLICATIONS

Ozsoy et al., C. Power Turbine Speed Control of the GE T700 Engine Using the Zero Steady-State Self-Tuning Regulator, IEEE Transactions on Intelligent Engineering Systems, Sep. 1997, pp. 371-378.*
Rabbath et al., C.A. A Methodology for the Potential Improvement of Gas-Turbine Engine Digital Control Systems, Proceedings of the 2000 IEEE International Conference on Control Applications, Sep. 2000, pp. 772-777.*
Langari, R. Past, Present and Future of Fuzzy Control: A Case for Application of Fuzzy Logic in Hierarchical Control. 18th International Conference on Fuzzy Information Processing Society, Jun. 1999, pp. 760-765.*
Boehm et al., C.F. Parameter Sensitivity Studies for Internal Combustion Engine Control and Design Purposes, Proceedings of the 10th Workshop on Design Automation, IEEE, Jun. 1973, pp. 240-246.*
European Search Report dated Jun. 17, 2003.

* cited by examiner

*Primary Examiner*—Russell Frejd
(74) *Attorney, Agent, or Firm*—Scott D. Wofsy; Edwards Angell Palmer & Dodge LLP (57) ABSTRACT

An adaptive aero-thermodynamic engine model is disclosed which incorporates a plurality of model engine operating parameters, a plurality of nominal component efficiencies and corresponding efficiency modifier functions. The engine model is adapted by measuring a plurality of engine operating parameters corresponding to the plurality of model engine operating parameters during steady state operation of the engine over a plurality of data points, matching each of the model engine operating parameters to respective measured engine operating parameters by iteratively adapting each of the nominal component efficiencies using the corresponding efficiency modifier functions, estimating actual component efficiencies based upon the adapted nominal component efficiencies, and inputting the estimated actual component efficiencies into the engine model.

14 Claims, 8 Drawing Sheets

ADAPTIVE AERO-THERMODYNAMIC ENGINE MODEL

GOVERNMENT RIGHTS STATEMENT

The U.S. Government has a paid-up license in this invention and the right in limited circumstances to require the patent owner to license others on reasonable terms as provided for by the terms of DAAH10-99-2-0005, awarded by the U.S. Department of the Army.

BACKGROUND OF THE INVENTION

1. Field of the Invention

The subject invention relates to the operation of gas turbine engines, and more particularly, to an adaptive aero-thermodynamic engine model for turboshaft engines.

2. Background of the Related Art

In the past, when it was desired to determine the physical condition of a gas turbine engine, various engine operating parameters would be measured and recorded during a test flight by a maintenance crew. The recorded data would then be employed to determine the health of the engine and, by way of example, whether turbine blade wear or thermal degradation had effected engine performance. Such a measurement procedure is time consuming and expensive.

Engine performance maps, either supplied by the engine manufacturer or derived from data supplied by the manufacturer, have also been used to predict engine performance over time. Such predictions, however, are not sufficiently accurate since engine performance maps do not take into account reduced performance resulting from component wear or thermal degradation.

The safe operation of a gas turbine engine powered aircraft, and in particular, a rotary wing type aircraft, would be significantly enhanced if the pilot could be provided with real-time information concerning the operational health of an engine. For example, knowing the maximum power availability in advance of attempting to operate or maneuver under a given set of flight conditions would be extremely useful. In addition, accurate real-time engine data would enable a pilot to detect and respond to sensor failures in a timely manner. This information would also be useful in determining the most desirable time to perform routine engine maintenance.

Thermodynamic engine models have also been used by engine manufacturers for fault detection and engine diagnostics. While conventional engine models are useful, they are limited in that they are unable to accurately model engine performance over time. Moreover, conventional engine models do not account for component efficiency degradation over time, nor do they account for higher order thermodynamic and mechanical effects on engine performance. Consequently, conventional engine models have not been used in operational aircraft.

SUMMARY OF THE INVENTION

The subject invention is directed to an new and useful adaptive aero-thermodynamic engine model for a turboshaft engine that is configured to accurately mirror an actual engine by accounting for the degradation of component efficiencies over time, as well as higher order thermodynamic and mechanical effects on engine performance. Once adapted, the engine model of the subject invention may be employed to predict maximum engine power availability, detect engine sensor failures or control the engine in the case of engine sensor failure.

The adaptive engine model of the subject invention includes means for storing a plurality of model engine operating parameters and a plurality of nominal engine component efficiencies and corresponding efficiency modifier functions. The model further includes means for receiving a plurality of measured engine operating parameters, and means for estimating actual engine component efficiencies by matching the model engine operating parameters to the measured engine operating parameters. Preferably, the means for estimating actual engine component efficiencies includes means for iteratively adapting each of the nominal component efficiencies using corresponding efficiency modifier functions.

The engine model also incorporates means for estimating an actual input fuel flow to the engine which includes a fuel flow modifier function for iteratively adapting a measured input fuel flow, and means for estimating an actual inlet guide vane angle for the engine which incorporates an inlet guide vane modifier function for iteratively adapting a measured inlet guide vane angle.

The subject invention is also directed to a method of adapting an aero-thermodynamic engine model for a turboshaft engine. The method includes the step of providing an adaptive aero-thermodynamic engine model incorporating a plurality of model engine operating parameters, a plurality of nominal component efficiencies and corresponding efficiency modifier functions. The method further includes the steps of measuring a plurality of engine operating parameters corresponding to the plurality of model engine operating parameters during steady state operation of the engine over a plurality of data points, and matching each of the model engine operating parameters to respective measured engine operating parameters by iteratively adapting each of the nominal component efficiencies using the corresponding efficiency modifier functions. The method further includes the steps of estimating actual component efficiencies based upon the adapted nominal component efficiencies and inputting the estimated actual component efficiencies into the engine model.

Preferably, the step of matching the model engine operating parameters to respective measured engine operating parameters includes the step of minimizing a combined measurement error between the model engine operating parameters and the measured engine operating parameters, and the step of minimizing the combined measurement error is terminated when a predetermined condition is met.

The method further includes the step of calibrating an input fuel flow to the engine by measuring the input fuel flow during steady state operation over a plurality of data points, iteratively adapting the input fuel flow using a fuel flow modifier function, and estimating the actual value of the input fuel flow based upon the adapted input fuel flow, wherein the estimated actual value of the input fuel flow is an input to the engine model. In addition, the method includes the step of calibrating an inlet guide vane angle of the engine by measuring the inlet guide vane angle during steady state operation over a plurality of data points, iteratively adapting the inlet guide vane angle using an inlet guide vane angle modifier function, and estimating the actual value of the inlet guide vane angle based upon the adapted inlet guide vane angle, wherein the estimated actual value of the inlet guide vane angle is an input to engine model.

These and other aspects of the subject invention and the method of using the same will become more readily apparent to those having ordinary skill in the art from the following detailed description of the invention taken in conjunction with the drawings described hereinbelow.

BRIEF DESCRIPTION OF THE DRAWINGS

So that those having ordinary skill in the art to which the subject invention pertains will more readily understand how to employ the adaptive aero-thermodynamic engine model of the subject invention, preferred embodiments thereof will be described in detail hereinbelow with reference to the drawings, wherein:

FIGS. 2($a$–$d$) illustrate a gas path signal flow diagram of an adaptive engine model for a three spool turboshaft engine configured in accordance with the subject invention.

DETAILED DESCRIPTION OF PREFFERED EMBODIMENTS

The adaptive aero-thermodynamic engine model disclosed herein may be employed in conjunction with any gas turbine engine configuration. However, in the specification that follows, reference will be made to a three spool turboshaft engine employed as the power plant for a rotary wing aircraft. Such an engine includes three spools or shafts designed to operate at different speeds, and is configured to optimize engine performance over a broad range of operating conditions. The first spool or shaft is operatively associated with the Low Pressure Compressor (LPC) and the Low Pressure Turbine (LPT). The second spool or shaft is operatively associated with the High Pressure Compressor (HPC) and High Pressure Turbine (HPC). The third spool is operatively associated with the Power Turbine (PT).

Figure 1:
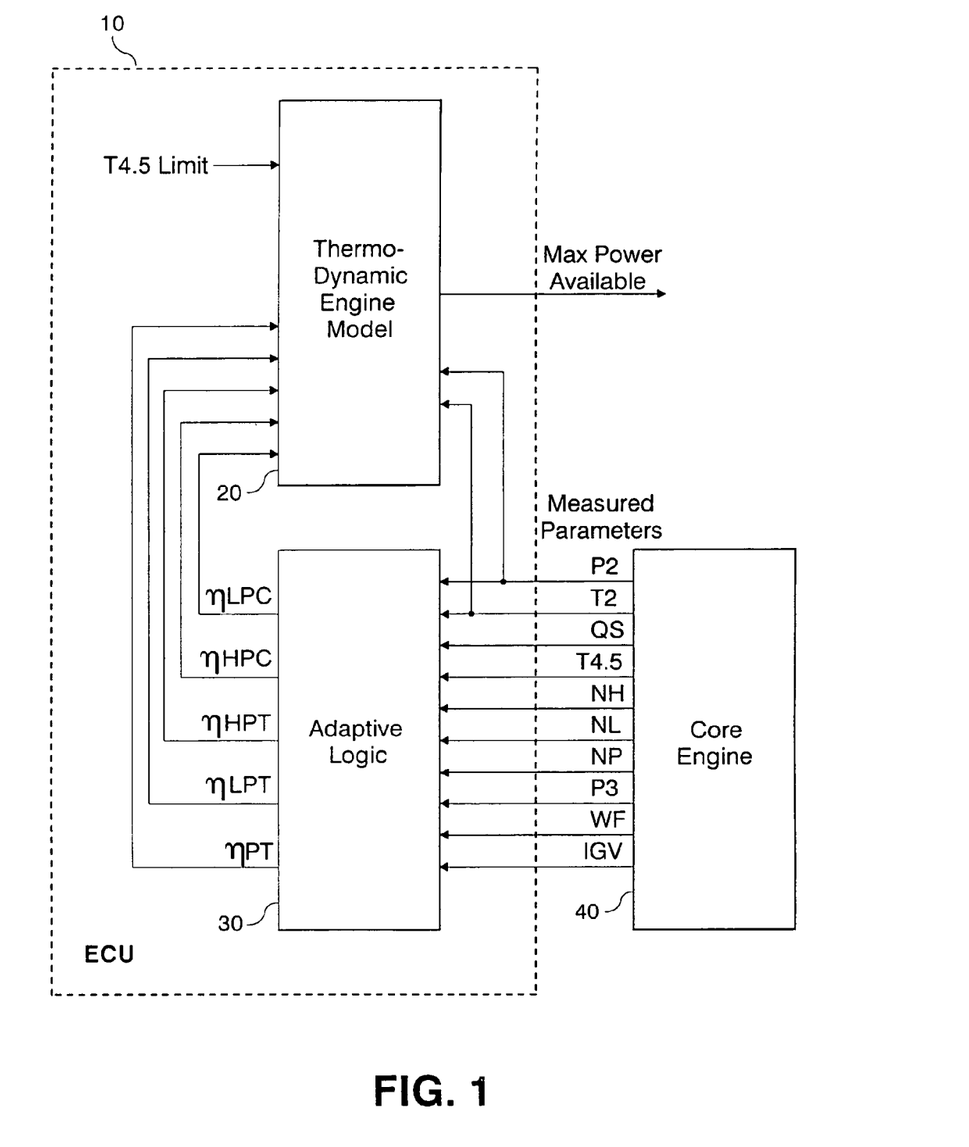
FIG. 1 is a schematic representation of an electronic control unit associated with an engine which includes an engine model and adaptive logic in accordance with the subject invention.
Figure 2A:
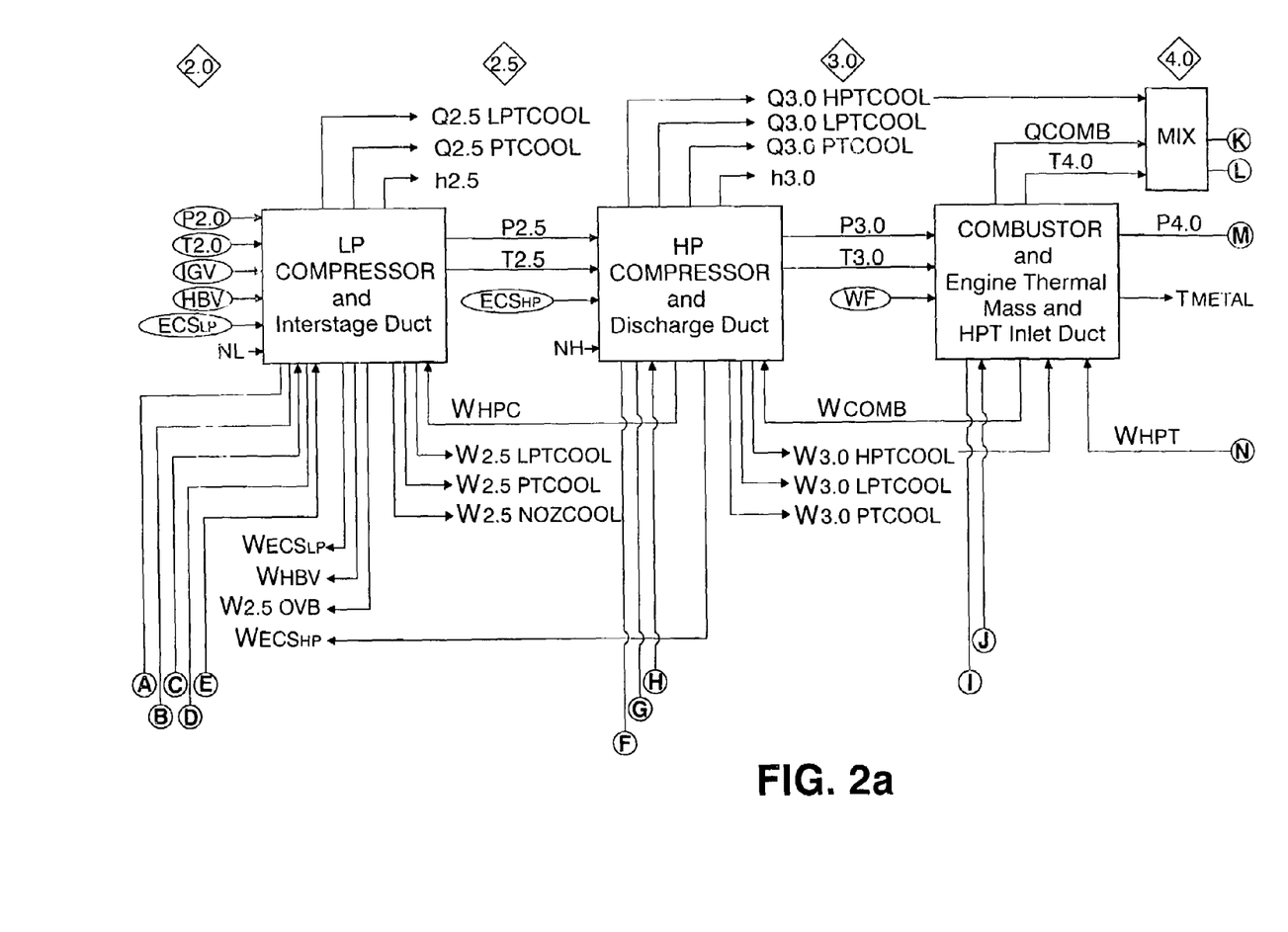
Figure 2B:
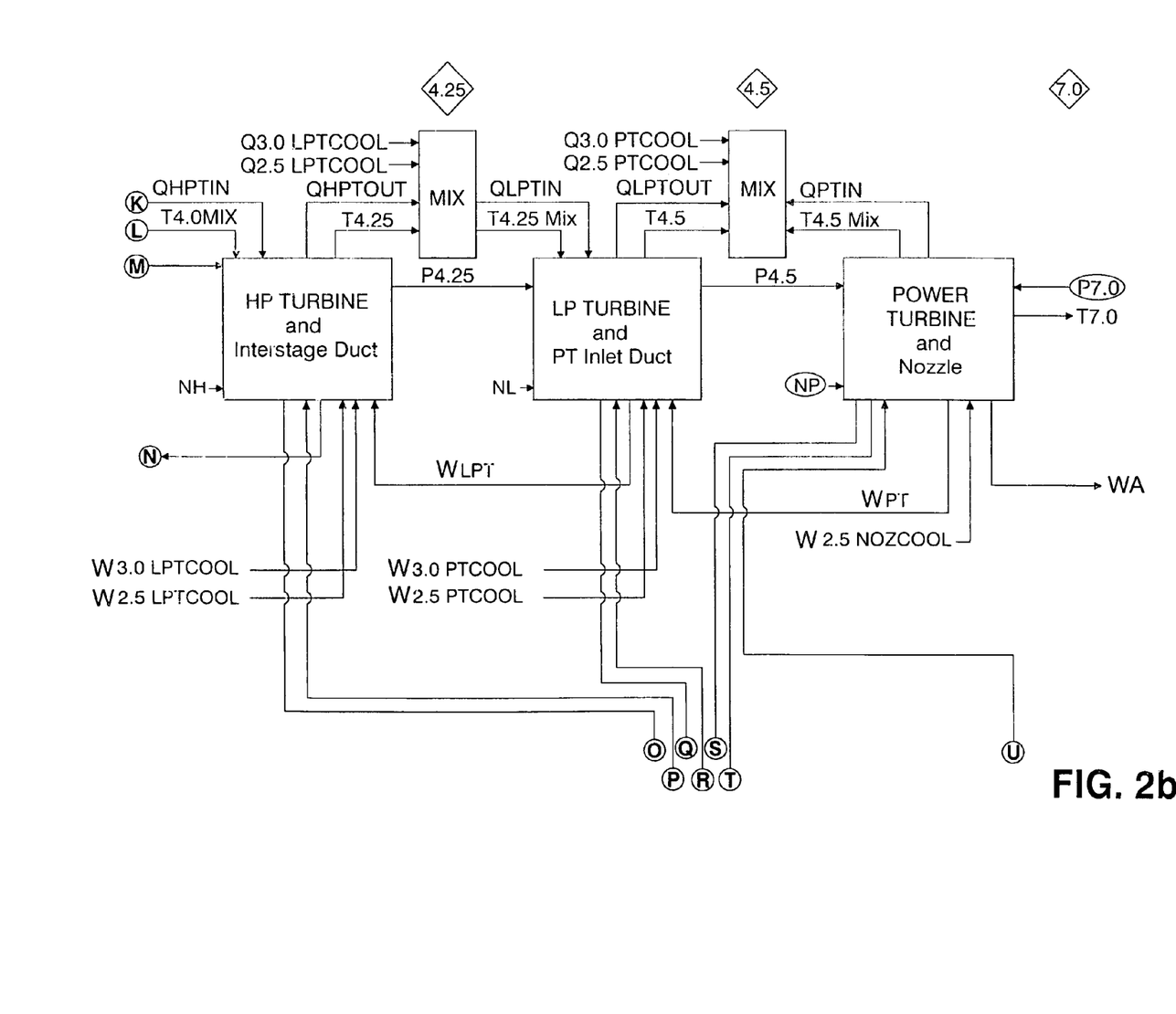
Figure 2C:
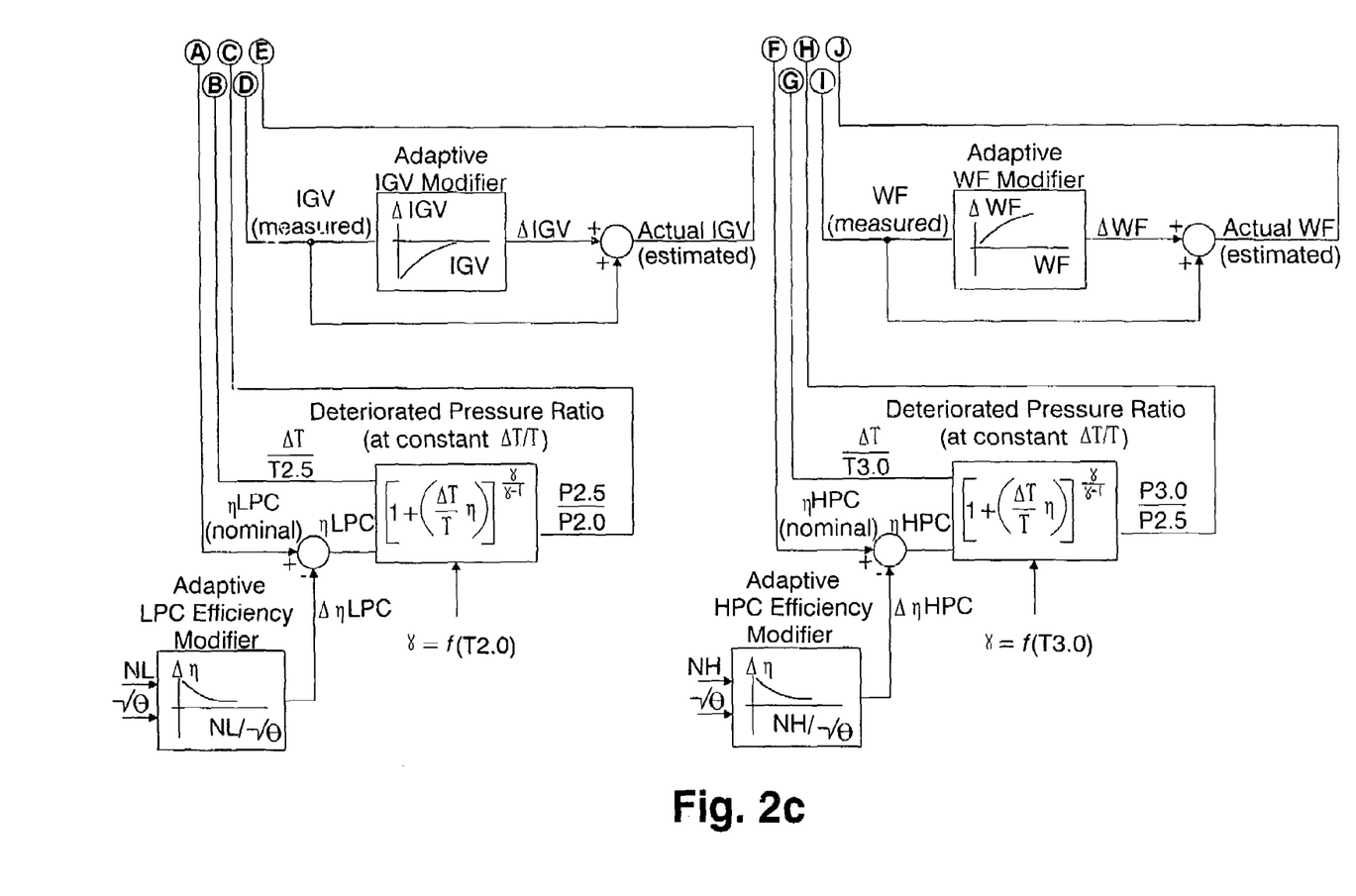
Figure 2D:
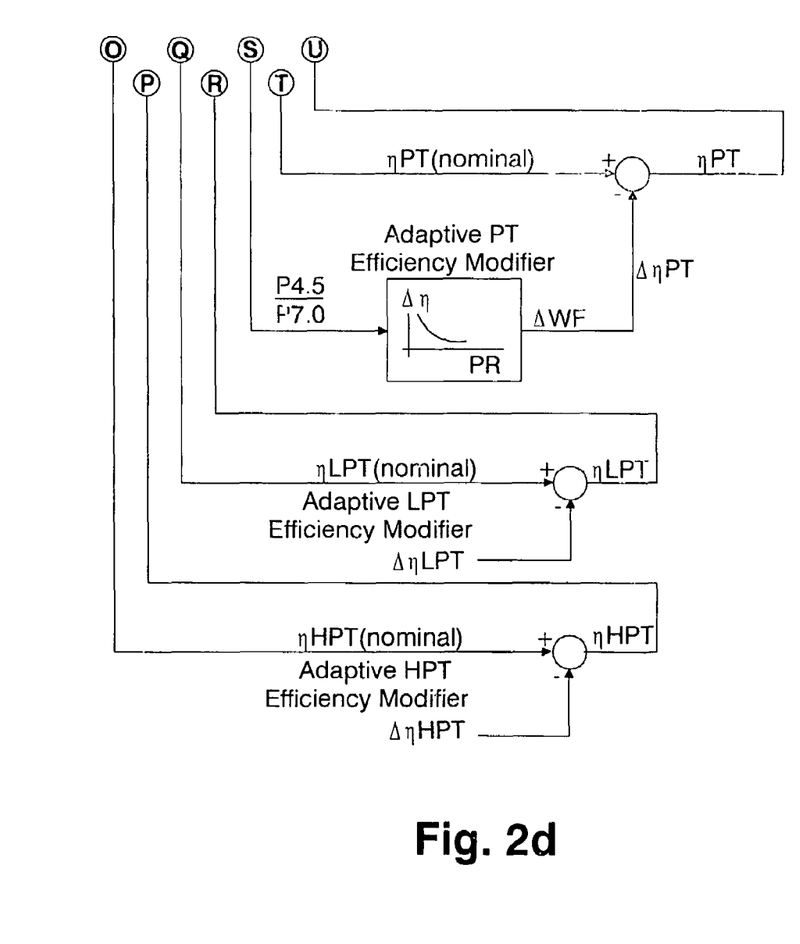

Several engine operating parameters are associated with a three spool turboshaft engine and will be referred to in the description of the invention. These operating parameters include the following:

$T_2$—Engine inlet temperature
$P_2$—Engine inlet pressure
QS—Engine Torque (SHP—Shaft HP)
$T_{4.5}$—Power Turbine Inlet Gas Temperature
NH—High Pressure Turbine Spool Speed
NL—Low Pressure Turbine Spool Speed
NP—Power Turbine Spool Speed
$P_3$—Compressor Discharge Pressure
WF—Fuel Flow
IGV—Inlet Guide Vane Angle Referring now to the drawings wherein like reference numerals identify similar features of the invention disclosed herein, there is illustrated in FIG. 1 a schematic diagram of an electronic control unit 10 with an embedded adaptive aero-thermodynamic engine model. More particularly, control unit 10 includes engine model 20 which stores in memory, among other things, data in the form of a plurality of model engine operating parameters and a plurality of nominal engine component efficiencies including:

$\eta_{LPC}$—Low Pressure Compressor Efficiency
$\eta_{HPC}$—High Pressure Compressor Efficiency
$\eta_{HPT}$—High Pressure Turbine Efficiency
$\eta_{LPT}$—Low Pressure Turbine Efficiency
$\eta_{PT}$—Power Turbine Efficiency Control unit 10 further includes an adaptive logic processor 30 which receives a plurality of measured engine operating parameters from an engine 40. These sensed parameters are measured over a plurality of data points during steady state flight conditions at a predetermined time. For example, after a predetermined number of flight hours, or upon demand. The adaptive logic processor 30 is programmed to match the model engine operating parameters to the measured engine operating parameters. This matching process is accomplished by executing an adaptive algorithm designed to iteratively adjust or adapt the nominal engine component efficiencies using modifier functions supplied by the engine manufacturer. The algorithm is terminated when a predetermined condition is met. The output of the algorithm is a plurality of estimated actual component efficiencies. These values are then input into the aero-thermodynamic engine model to accurately mirror actual engine performance over time. Once fully adapted, the engine model can be used for fault detection and accommodation, or engine control in the case of sensor failure.

Referring now to FIG. 2, there is depicted the gas path flow diagram of the adaptive engine model. The engine model includes the LPC and Interstage Duct; the HPC and Discharge Duct; the Combustor, Thermal Mass and HPT Inlet Duct; the HPT and Interstage Duct; and the Power Turbine and Nozzle. The gas path includes a series of stations, each identified numerically, where engine operating parameters such as, for example, inlet and outlet pressures and temperatures, heat flow, air or gas flow, fuel flow and enthalpy are input into the engine model.

Station 2.0 identifies the inlet to the LPC. At this station, the primary engine operating parameters used as model inputs are the inlet pressure $P_{2.0}$ and inlet temperature $T_{2.0}$, the Inlet Guide Vane Angle (IGV), and the Bleed Valve Position (HBV). In the model, the bleed valves are assumed to be in a closed position. In addition, the spool speed of the low pressure compressor (NL) is input into the model. Station 2.5 identifies the inlet to the HPC. The primary operating parameters at this station are the compressor inlet pressure $P_{2.5}$ and the compressor inlet temperature $T_{2.5}$. In addition, the spool speed of the high pressure compressor (NH) is input into the model.

Station 3.0 identifies the inlet to the combustor. At this station, the combustor inlet pressure and inlet temperature $P_{3.0}$ and $T_{3.0}$ along with the fuel flow (WF) are input into the engine model. Station 4.0 identifies the inlet to the HPT. The primary operating parameters at this station are the turbine inlet pressure $P_{4.0}$ and spool speed (NH). Station 4.25 identifies the inlet to the LPT where the primary operating parameters are the inlet pressure $P_{4.25}$ and spool speed (NL). Station 4.5 identifies the inlet to the PT. At this station, the primary engine operating parameters are the inlet pressure $P_{4.5}$ and the engine Horsepower (HP). The final station in the engine model is 7.0, where the primary operating parameter is the turbine exit pressure $P_{7.0}$.

Turning now to the adaptive aspects of the aero-thermodynamic engine model illustrated in FIG. 2 which embody the adaptive algorithm of the subject invention. The adaptive algorithm used to match the engine model data to the actual engine data does not use measured fuel flow (WF) and Inlet Guide Vane Angle (IGV) directly because there is uncertainty in these critical inputs due to calibration tolerances in the guide vanes and variations in fuel type, temperature and batch. Therefore, in the adaptive algorithm, WF and IGV estimates are adjusted along with the engine component efficiencies in an effort to accurately match the engine model to the measured engine performance.

The estimation of the inlet guide vane angle (ICRV) is an iterative process involving a plurality of steady state data points and is depicted in FIG. 2. It involves inputting sensed measurements of the IGV into an adaptive IGV modifier function to obtain a correlated ΔIGV. The ΔIGV and the measured IGV are then added to obtain the estimated IGV for the engine. This estimate is used as an input to the engine model. The estimation of the fuel flow (WF) is also an iterative process, and involves inputting sensed measurements of WF into an adaptive WF modifier function to obtain a correlated ΔWF. The ΔWF and the measured WF are then added to obtain the estimated WF for the engine. This estimated value is also used as an input into the engine model. The adaptive modifier functions have been derived over time based upon thermodynamic engine data and experience.

In essence, the by-product of the adaptive process is an on-line calibration of the WF and IGV measurements. In particular, the difference between the measured and estimated values of WF and IGV, i.e., the bias, is stored in memory as a function of the measured parameters, WF and IGV, respectively. This bias can then be added or subtracted (depending upon the sign) to the measured values to estimate more accurately the actual values of the parameters. These values are then used as inputs to the engine model to more accurately compute engine outputs.

With continuing reference to FIG. 2, once the WF and IGV estimations have been completed, the remaining model adaptation parameters i.e., the component efficiencies, are iteratively adjusted to match the model operating parameters to the measured parameters. In particular, the Low Pressure Compressor Efficiency ($\eta_{LPC}$) is iteratively adapted by obtaining a $\Delta\eta_{LPC}$ from an adaptive LPC efficiency modifier function derived from thermodynamic engine data. The modifier function receives measured engine data in the form of low pressure spool speed (NL) and the square root of the temperature ratio Θ (i.e., the ratio of the ambient temperature to the standard day temperature at sea level). The output from the modifier function is $\Delta\eta_{LPC}$. The resulting value is then subtracted from a model or nominal $\Delta\eta_{LPC}$ to obtain the component efficiency $\eta_{LPC}$. This value is then used as the input to a Deteriorated Pressure Ratio (DPR) function along with the model quantity $\Delta T/T_{2.5}$. The DPR function is also derived over time from thermodynamic data and experience. The output from the DPR function is the ratio of $P_{2.5}/P_{2.0}$. This value is then input into the engine model at the LPC station.

The High Pressure Compressor Efficiency ($\eta_{HPC}$) is iteratively adapted by obtaining a $\Delta\eta_{HPC}$ from an adaptive HPC efficiency modifier function derived over time from thermodynamic engine data and experience. The modifier function receives measured engine data in the form of high pressure spool speed (NH) and the square root of the temperature ratio Θ. The output from the modifier function is $\Delta\eta_{HPC}$. This value is then subtracted from a nominal $\eta_{LPC}$ to obtain the component efficiency Tiwc. The resulting value is then used as the input to a DPR function along with the model quantity $\Delta T/T_{3.0}$. This modifier function is also derived over time from thermodynamic engine data. The output from the Deteriorated Pressure Ratio function is the ratio of $P_{3.0}/P_{2.5}$. This value is input into the engine model at the HPC station.

The component efficiencies $\eta_{HPT}$ and $\eta_{LPT}$ are iteratively adapted with less computational difficulty than $\eta_{LPC}$ and $\eta_{HPC}$, since it has established by experience and engine data analysis that these component efficiencies degrade uniformly over time. Accordingly, the adaptation of $\eta_{HPT}$ is accomplished by subtracting $\Delta\eta_{HPT}$ and $\eta_{LPT}$ from nominal values of HPT and LPT, respectively. The resulting outputs are $\eta_{HPT}$ and $\eta_{LPT}$. These components of efficiency are input into the engine model at the HPT and LPT stations, respectively.

The Power Turbine Efficiency ($\eta_{PT}$) is iteratively adapted by obtaining a $\Delta\eta_{PT}$ from an adaptive PT efficiency modifier function derived over time using thermodynamic engine data. This modifier function receives measured engine data in the form of the pressure ratio $P_{4.5}/P_{7.0}$. The output from the modifier function is $\Delta\eta_{PT}$. The resulting value is then subtracted from a nominal $\eta_{PT}$ to obtain the component efficiency $\eta_{PT}$. This component of efficiency is input into the engine model at the PT station.

Once each of the estimated actual component efficiencies ($\eta_{LPC}$, $\eta_{HPC}$, $\eta_{HPT}$, $\eta_{LPT}$, $\eta_{PT}$) have been input into the engine model, the fully adapted engine model can accurately mirror the operational characteristics of the actual engine. At such a time, the engine model may be employed, for example, to accurately predict the maximum engine power availability. This would enable a pilot to know whether the engine has sufficient power to perform a particular maneuver. Alternatively, the adapted engine model may be used as a fault diagnostic tool to detect engine sensor failures by comparing sensed data to the adapted engine model data. For example, if a sensor is providing a value that differs from an adapted engine value, the pilot will be alerted that a fault has been detected. In addition, because the adapted engine model of the subject invention provides extremely accurate real-time data as to the operating parameters of the engine, the engine model may be incorporated into a Full Authority Digital Electronic Control (FADEC) and utilized to control the engine in case of sensor failure.

The adaptive process illustrated in FIG. 2 and described hereinabove is embodied in an adaptive algorithm. The adaptation is formulated as the following non-linear least squares minimization problem:

$$F(\eta) = \sum_{i=1}^{N} \left\{ \alpha_i \left( \frac{Q_i - \overline{Q_i}}{\overline{Q_i}} \right)^2 + \beta_i \left( \frac{NL_i - \overline{NL_i}}{\overline{NL_i}} \right)^2 + \gamma_i \left( \frac{NH_i - \overline{NH_i}}{\overline{NH_i}} \right)^2 + \delta_i \left( \frac{T_{4.5i} - \overline{T_{4.5i}}}{\overline{T_{4.5i}}} \right)^2 + \omega_i \left( \frac{P_{3i} - \overline{P_{3i}}}{\overline{P_{3i}}} \right)^2 \right\}$$

where N=Number of data points,

η=Efficiency Modifier Vector ($\eta_{LPC}$, $\eta_{HPC}$, $\eta_{HPT}$, $\eta_{LPT}$, $\eta_{PT}$), $Q_i$, $NL_i$, $NH_i$, $T_{4.5i}$ and $P_{3i}$ are model computed values as a function of η

$\overline{Q_i}$, $\overline{NL_i}$, $\overline{NH_i}$, $\overline{T_{4.5i}}$, and $\overline{P_{3i}}$ are measured quant $\alpha_i$, $\beta_i$, $\gamma_i$, $\delta_i$ and $\omega_i$ are weighting parameters (equal to 1)

The least squares computation procedure is based on the gradient or sensitivity of the function F(η) with respect to the five efficiency modifiers. The gradient vector is as follows:

$$\frac{\partial F}{\partial \eta} = \left[ \frac{\partial F}{\partial \eta_{LPC}}, \frac{\partial F}{\partial \eta_{HPC}}, \frac{\partial F}{\partial \eta_{HPT}}, \frac{\partial F}{\partial \eta_{LPT}}, \frac{\partial F}{\partial \eta_{PT}} \right]$$

The following illustrates the computation of the first element in the gradient vector. The remaining four terms are computed in an analogous manner.

$$\frac{\partial F}{\partial \eta_{LPC}} =$$

$$\sum_{i=1}^{N} \left\{ 2\alpha_i \left( \frac{Q_i - \overline{Q}_i}{\overline{Q}_i} \right) \frac{\partial Q_i}{\partial \eta_{LPC}} + 2\beta_i \left( \frac{NL_i - \overline{NL}_i}{\overline{NL}_i} \right) \frac{\partial NL_i}{\partial \eta_{LPC}} + 2\gamma_i \left( \frac{NH_i - \overline{NH}_i}{\overline{NH}_i} \right) \right.$$

$$\left. \frac{\partial NH_i}{\partial \eta_{LPC}} + 2\delta_i \left( \frac{T_{4.5i} - \overline{T}_{4.5i}}{\overline{T}_{4.5i}} \right) \frac{\partial T_{4.5i}}{\partial \eta_{LPC}} + 2\omega_i \left( \frac{P_{3i} - \overline{P}_{3i}}{\overline{P}_{3i}} \right) \frac{\partial P_{3i}}{\partial \eta_{LPC}} \right\}$$

Computation of the $$\frac{\partial Q_i}{\partial \eta_{LPC}}, \frac{\partial NL_i}{\partial \eta_{HPC}}, \frac{\partial NH_i}{\partial \eta_{HPT}}, \frac{\partial T_{4.5i}}{\partial \eta_{LPT}}, \frac{\partial P_{3i}}{\partial \eta_{PT}}$$

terms in the equation above involves perturbing the engine model and running to steady state for each $i^{th}$ power condition. The engine model subroutine is repeatedly called by the adaptation program with the efficiency vector η as the input argument. Given that $Q_i$, $NL_i$, $NH_i$, $T_{4.5i}$ and $P_{3i}$ are computed at the η at the start of the adaptation step following collection of N data points, the program computes:

$$Q_i + \Delta Q_i, NL_i + \Delta NL_i, NH_i + \Delta NH_i, T_{4.5i} + \Delta T_{4.5i}, P_{3i} + \Delta P_{3i}$$

corresponding to $\eta = [\eta_{LPC} + \eta_{LPC}, \eta_{HPC}, \eta_{HPT}, \eta_{LPT}, \eta_{PT}]$. Those skil readily appreciate that this statement corresponds to a perturbation of the engine model in $\eta_{LPC}$ only while keeping the other four efficiency modifiers fixed.

After the components of the gradient vector are computed, a steepest decent process is used to update the efficiency modifier vector using the following equation involving the gradient vector:

$$[\Delta \eta_{LPC}, \Delta \eta_{HPC}, \Delta \eta_{HPT}, \Delta \eta_{LPT}, \Delta \eta_{PT}]_{NEW} =$$

$$[\Delta \eta_{LPC}, \Delta \eta_{HPC}, \Delta \eta_{HPT}, \Delta \eta_{LPT}, \Delta \eta_{PT}]_{OLD} -$$

$$S \cdot \left[ \frac{\partial F}{\partial \eta_{LPC}}, \frac{\partial F}{\partial \eta_{HPC}}, \frac{\partial F}{\partial \eta_{HPT}}, \frac{\partial F}{\partial \eta_{LPT}}, \frac{\partial F}{\partial \eta_{PT}} \right]$$

where S is the step size and is a scalar quantity. The five-dimensional minimization is then transformed into a one-dimensional problem for determining S, and any standard computational method can be used to compute S. Those skilled in the art should recognize that the minimization problem involves multiple computations of the function F, and depending upon the change in performance over the i data points, multiple steepest decent steps may be necessary to complete the minimization process.

The iterations are terminated if any of the following three criteria or conditions are satisfied:

1) The "error" between the measured and model predicted parameters is below a specified limit.

$$|F(\eta)| \leq 0.001$$

2) The gradient is below a specified limit. This would imply that the model matching has been accomplished to a point where the matching is "insensitive" to he parameters being estimate. This could arise when the difference between the measured and model predicted parameters is due to sensor measurement errors.

$$\left| \frac{\partial F}{\partial \eta} \right| \leq 0.0001$$

where the magnitude of the gradient vector is the square root of the sum of the squares of the individual component.

3) The parameter update rate has reached a specified limit. This would arise when the computed step size is very small due to the inability of the gradient function to represent the direction of the model matching error. This is typically caused by "unobservability" i.e., the difference in measured and model predicted engine parameters is caused by factors other than mathematically represented in the engine model.

$$S \cdot \left| \frac{\partial F}{\partial \eta} \right| \leq 0.000001$$

Figure 3A:
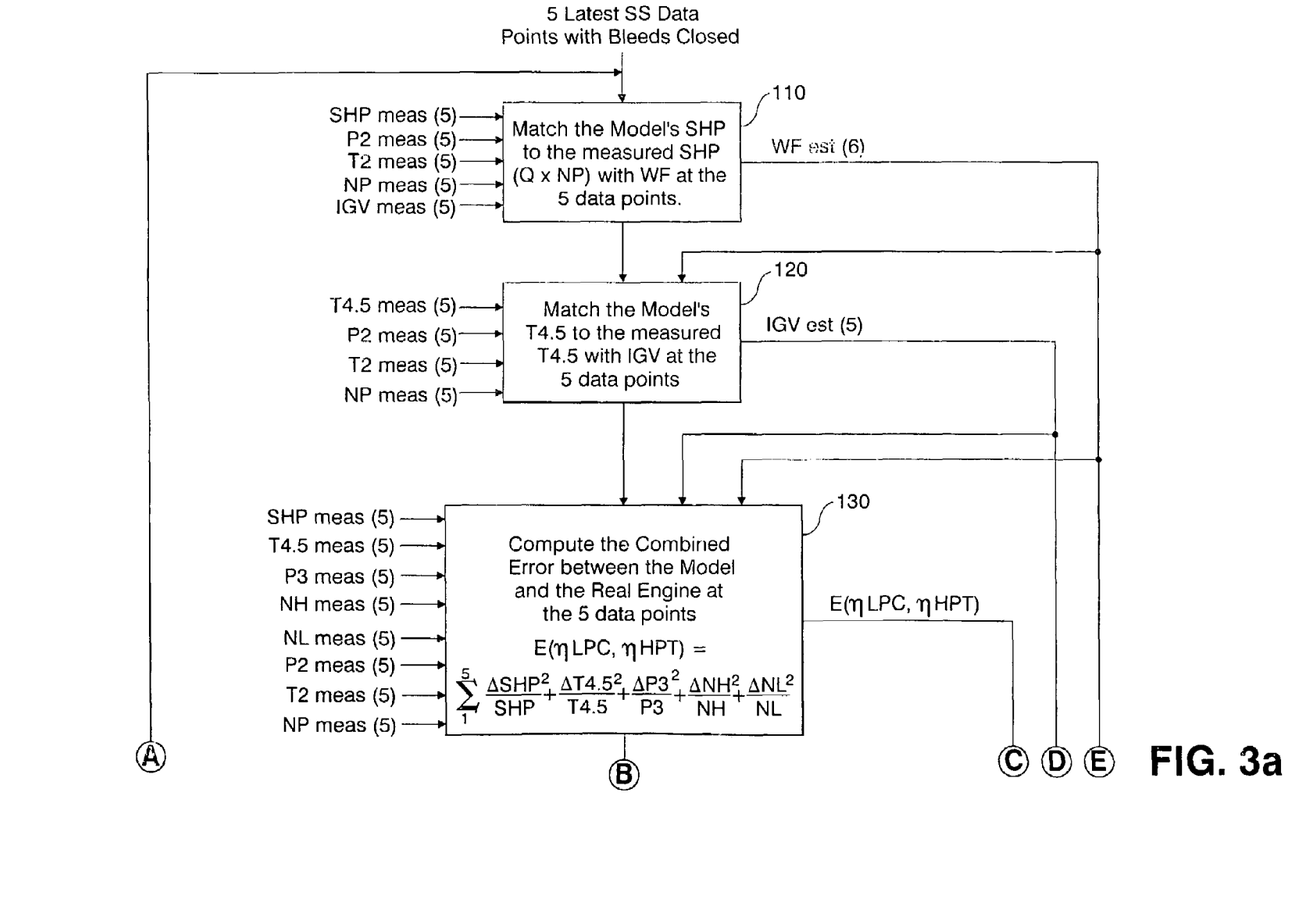
FIG. 3 is flow chart illustrating the adaptive algorithm employed by the engine model of the subject invention.
Figure 3B:
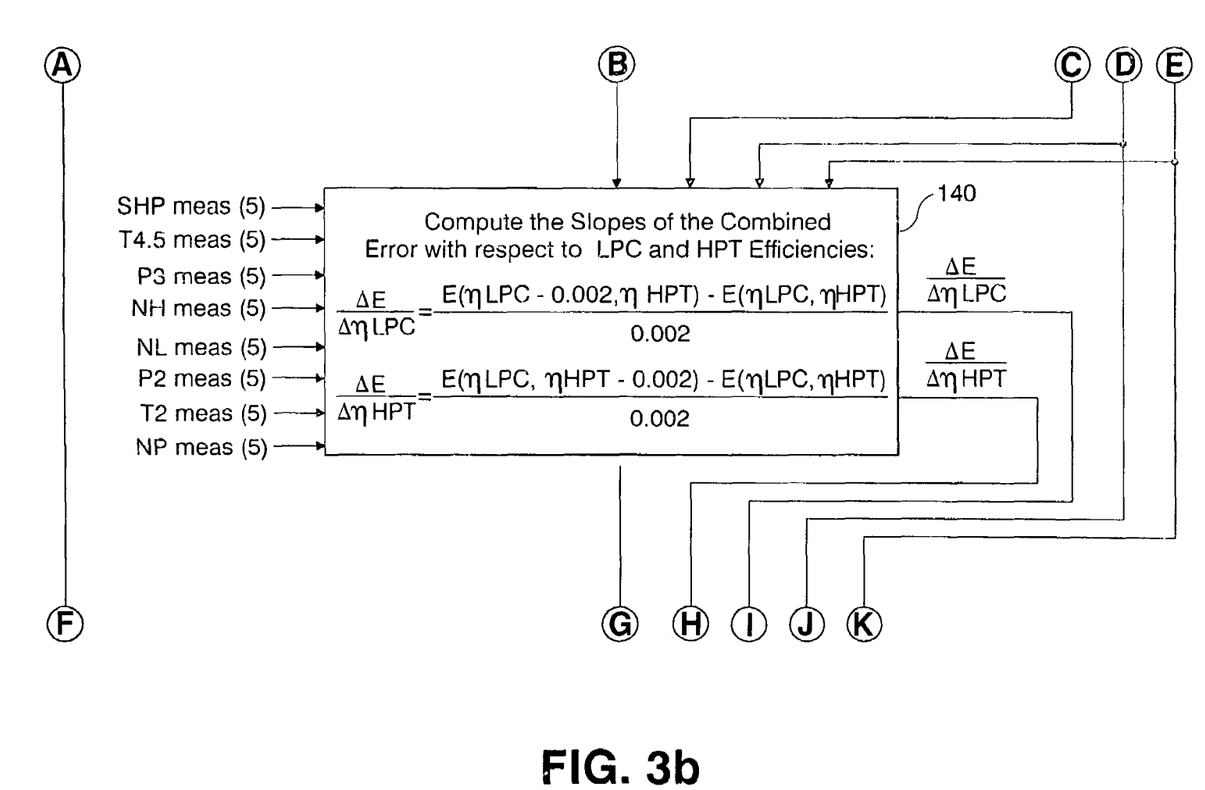
Figure 3C:
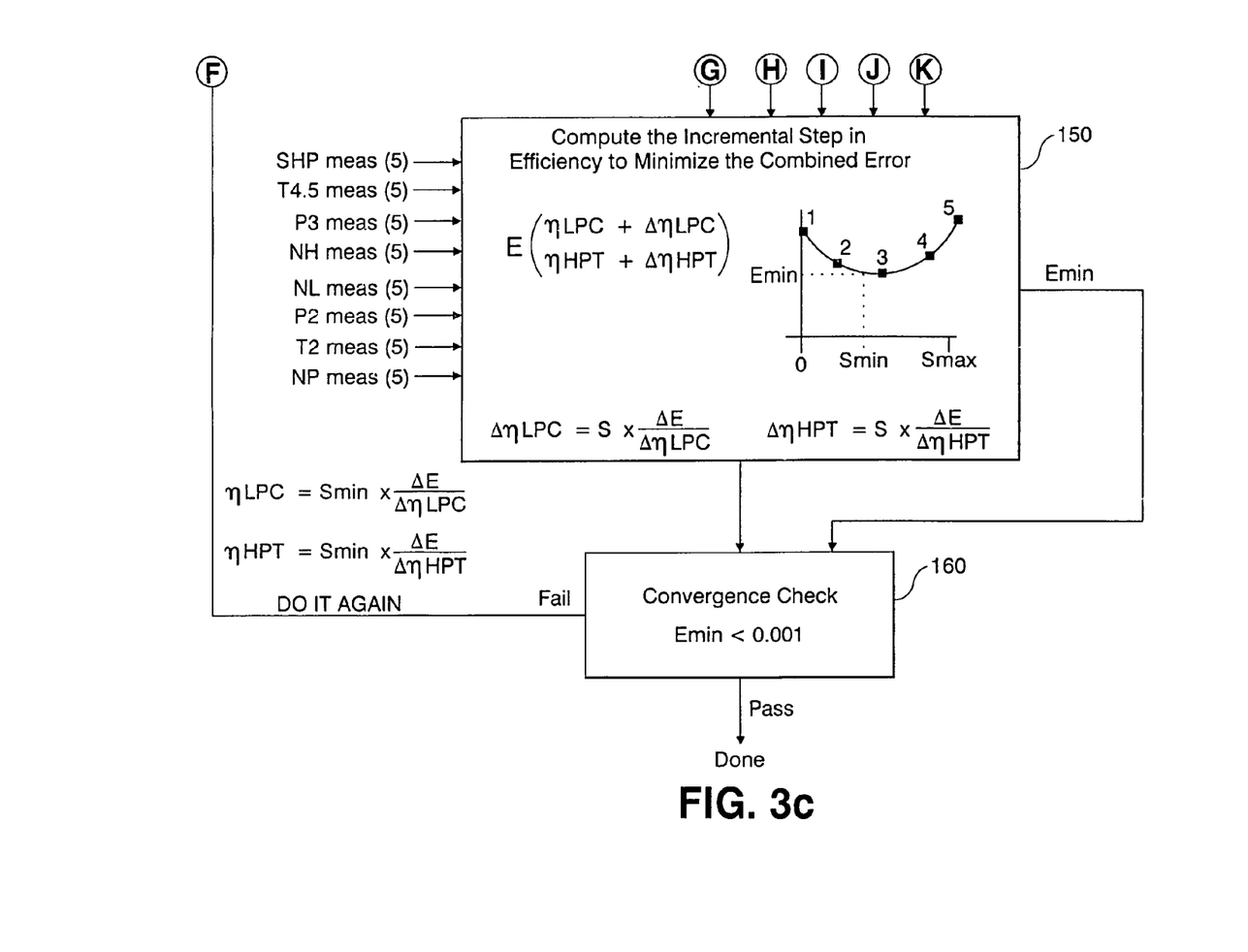

Referring now to FIG. 3, there is illustrated a flow diagram illustrating the minimization problem described hereinabove. For purposes of illustration and simplification, the problem has been reduced to a two-dimensional computation involving $\eta_{LPC}$ and $\eta_{HPT}$. Those skilled in the art will readily appreciate that the adaptive algorithm depicted in FIG. 3 may be easily expanded to a five-dimensional minimization problem involving $\eta_{LPC}$, $\eta_{HPC}$, $\eta_{HPT}$, $\eta_{LPT}$, and $\eta_{PT}$, as described above.

Initially, five steady state data points are measured and input into the engine model for each of the operating parameters used in the adaptation process. The computational process then commences at step 110 by matching the engine model shaft horsepower (SHP) to the measured shaft horsepower independent of any other engine operating parameters. This is accomplished by an iterative adjustment of the fuel flow parameter (WF), and results in an estimated actual value for the inlet fuel flow. It should be noted that the shaft horsepower is the product of the Engine Torque (Q) and the Turbine Spool Speed (NP) or (Q×NP).

At step 120 the engine model Turbine Gas Temperature $T_{4.5}$ is matched to the measured Turbine Gas Temperature $T_{4.5}$ independent of any other engine operating parameters. This is accomplished by an iterative adjustment of the inlet guide vane angle (IGV), which results in an estimated actual value for the inlet guide vane angle. The estimated actual values of WF and IGV are then used as inputs into the engine model.

At step 130, the combined measurement error E between the engine model and the actual engine is computed as a function of $\eta_{LPC}$ and $\eta_{HPT}$. This is accomplished by summing the individual errors for SHP, $T_{4.5}$, $P_3$, NH and NL over the measured data points. The resulting combined error function is expressed as $E(\eta_{LPC}, \eta_{HPT})$. At step 140, the partial derivatives of the function, or the slopes of the combined error are computed with respect to $\eta_{LPC}$ and $\eta_{HPT}$ in accordance with the following equations:

$$\frac{\Delta E}{\Delta \eta_{LPC}} = \frac{E(\eta_{LPC} - 0.002, \eta_{HPT}) - E(\eta_{LPC}, \eta_{HPT})}{0.002}$$

$$\frac{\Delta E}{\Delta \eta_{HPT}} = \frac{E(\eta_{LPC}, \eta_{HPT} - 0.002) - E(\eta_{LPC}, \eta_{HPT})}{0.002}$$

Thereafter, at step 150, a curve is generated for the error function $E(\eta_{LPC}+\Delta\eta_{LPC},\eta_{HPT}+\Delta\eta_{HPT})$ using five steady state data points and the following equations:

$$\Delta\eta_{LPC} = S \times \frac{\Delta E}{\Delta\eta_{LPC}} \quad \Delta\eta_{HPT} = S \times \frac{\Delta E}{\Delta\eta_{HPT}}$$

Then, using the steepest descent method, the incremental step in efficiency to minimize the combined error function is computed. The minimize combined error $E_{min}$ is then subjected to a convergence check at step 160. If the minimized combined error $E_{min}$ is less than 0.001, then the process is terminated, and the computed $\eta_{LPC}$ and $\eta_{HPT}$ are input into the engine model to complete the adaptation process. If the minimized combined error $E_{min}$ is not less than 0.001, then the process is repeated using the computed $\eta_{LPC}$ and $\eta_{HPT}$ which are determined from the following formulas:

$$\eta_{LPC} = S_{min} \times \frac{\Delta E}{\Delta\eta_{LPC}} \quad \eta_{HPT} = S_{min} \times \frac{\Delta E}{\Delta\eta_{HPT}}$$

This process is repeated in an iterative manner until the termination condition is met.

Although the engine model of the subject invention and the method of employing the model have been described with respect to preferred embodiments, those skilled in the art will readily appreciate that changes and modifications may be made thereto without departing from the spirit and scope of the present invention as defined by the appended claims. For example, while the disclosed engine model is adapted with respect to certain engine operating parameters, other operating parameters may also be adapted using different components of efficiency.

What is claimed is:

1. A processor-based method of adapting an aero-thermodynamic engine model for a turboshaft engine comprising the steps of:
   a) providing an adaptive aero-thermodynamic engine model incorporating a plurality of model engine operating parameters, a plurality of nominal component efficiencies and corresponding efficiency modifier functions;
   b) measuring a plurality of engine operating parameters corresponding to the plurality of model engine operating parameters during steady state operation of the engine over a plurality of data points;
   c) matching each of the model engine operating parameters to respective measured engine operating parameters by iteratively adapting each of the nominal component efficiencies using the corresponding efficiency modifier functions;
   d) estimating actual component efficiencies based upon the adapted nominal component efficiencies; and
   e) inputting the estimated actual component efficiencies into the engine model.

2. A processor-based method of adapting an aero-thermodynamic engine model according to claim 1, further comprising the step of predicting maximum engine power availability based on the adapted engine model.

3. A method of adapting an aero-thermodynamic engine model according to claim 1, further comprising the step of detecting engine sensor failures based on the adapted engine model.

4. A processor-based method of adapting an aero-thermodynamic engine model according to claim 1, further comprising the step of controlling the engine based on the adapted engine model.

5. A processor-based method of adapting an aero-thermodynamic engine model according to claim 1, wherein the step of matching the model engine operating parameters to respective measured engine operating parameters includes the step of minimizing a combined measurement error between the model engine operating parameters and the measured engine operating parameters.

6. A processor-based method of adapting an aero-thermodynamic engine model according to claim 5, wherein the step of minimizing the combined measurement error is terminated when a predetermined condition is met.

7. A processor-based method of adapting an aero-thermodynamic engine model according to claim 1, further comprising the step of calibrating an input fuel flow to the engine by measuring the input fuel flow during steady state operation over a plurality of data points, iteratively adapting the input fuel flow using a fuel flow modifier function, and estimating the actual value of the input fuel flow based upon the adapted input fuel flow, wherein the estimated actual value of the input fuel flow is an input to the engine model.

8. A processor-based method of adapting an aero-thermodynamic engine model according to claim 1, further comprising the step of calibrating an inlet guide vane angle of the engine by measuring the inlet guide vane angle during steady state operation over a plurality of data points, iteratively adapting the inlet guide vane angle using an inlet guide vane angle modifier function, and estimating the actual value of the inlet guide vane angle based upon the adapted inlet guide vane angle, wherein the estimated actual value of the inlet guide vane angle is an input to engine model.

9. An electronic control unit having an embedded adaptive aero-thermodynamic engine model for a turboshaft engine comprising:
   a) means for storing a plurality of model engine operating parameters and a plurality of nominal engine component efficiencies and corresponding efficiency modifier functions;
   b) means for receiving a plurality of measured engine operating parameters; and
   c) means for estimating actual engine component efficiencies by matching the model engine operating parameters to the measured engine operating parameters.

10. An electronic control unit having an embedded adaptive aero-thermodynamic engine model as recited in claim 9, wherein the means for estimating actual engine component efficiencies includes means for iteratively adapting each of the nominal component efficiencies using the corresponding efficiency modifier functions.

11. An electronic control unit having an embedded adaptive aero-thermodynamic engine model as recited in claim 9, further comprising means for estimating an actual input fuel flow to the engine.

12. An electronic control unit having an embedded adaptive aero-thermodynamic engine model as recited in claim 11, wherein the means for estimating an actual input fuel flow to the engine includes a fuel flow modifier function for iteratively adapting a measured input fuel flow.

13. An electronic control unit having an embedded adaptive aero-thermodynamic engine model as recited in claim 9, further comprising means for estimating an actual inlet guide vane angle for the engine.

14. An electronic control unit having an embedded adaptive aero-thermodynamic engine model as recited in claim 13, wherein the means for estimating an actual inlet guide vane angle for the engine includes an inlet guide vane modifier function for iteratively adapting a measured inlet guide vane angle.

* * * * *